United States Patent

Matchett et al.

[11] Patent Number: 5,335,278
[45] Date of Patent: Aug. 2, 1994

[54] FRAUD PREVENTION SYSTEM AND PROCESS FOR CELLULAR MOBILE TELEPHONE NETWORKS

[75] Inventors: Noel D. Matchett, Silver Spring; J. Neil Birch, Potomac, both of Md.

[73] Assignee: Wireless Security, Inc., Silver Spring, Md.

[21] Appl. No.: 816,602

[22] Filed: Dec. 31, 1991

[51] Int. Cl.⁵ ...................... H04L 9/32; H04M 11/00
[52] U.S. Cl. ..................................... 380/23; 375/1; 380/29; 380/30; 380/34; 380/49; 379/59; 379/63; 340/825.31; 340/825.34; 455/33.1; 455/53.1; 455/54.1; 455/56.1
[58] Field of Search ................ 375/1; 380/9, 23, 29, 380/30, 34, 49, 50; 340/825.31, 825.34; 379/58, 59, 62, 63, 145; 455/33.1, 53.1, 54.1, 54.2, 56.1

[56] References Cited

U.S. PATENT DOCUMENTS

| | | | |
|---|---|---|---|
| 3,355,556 | 11/1967 | Chaney | 379/63 |
| 4,233,473 | 11/1980 | Frost | 379/59 |
| 4,658,416 | 4/1987 | Tanaka | 379/57 |
| 4,776,003 | 10/1988 | Harris | 379/91 |
| 4,831,647 | 5/1989 | D'Avello et al. | 379/91 |
| 4,955,049 | 9/1990 | Ghisler | 379/58 |
| 4,958,368 | 9/1990 | Parker | 379/91 |
| 5,003,629 | 3/1991 | Ness-Cohn | 455/32.1 |
| 5,077,790 | 12/1991 | D'Amico et al. | 380/23 |
| 5,153,919 | 10/1992 | Reeds, III et al. | 380/23 X |
| 5,204,902 | 4/1993 | Reeds, III et al. | 380/23 |

OTHER PUBLICATIONS

"Status of and Fraud Protection Measures for North American Cellular Systems" by Sam McConoughey for TIA, Dec. 13, 1991, p. 5.
"Cellular Fraud" by Henry M. Kowalczyk, Mar. 1991 issue of *Cellular Business*, pp. 33-34.
"Responses to Japan's Ministry of Post and Telecommunications Study Team Questions on Cellular Fraud" by Mr. Eric Hill for CTIA, Dec. 1991, pp. 5-6.
"Parameters for Fraud Management Using Network Based Techniques" by Messrs. R. Mechaley and K. Carlson for TIA, Sep. 30, 1991, pp. 2, 3, 4, 10.
"Cellular System Dual-Mode Mobile Station-Base Station Compatibility Standard" IS-54 (Revision A) by Electronic Industries Association, Dec. 1990, pp. 84-85.

*Primary Examiner*—Bernarr E. Gregory

[57] ABSTRACT

An improved mobile telephone system, including a process and apparatus for detecting fraudulent requests for roamer cellular telephone services before the requested service is granted. The improvement comprises a distributed, readily updatable fraud prevention processor which facilitates a plurality of independent, geographically dispersed cooperating cellular networks to each locally determine if a roamer request for service is from a valid, currently authorized user subscriber before cellular telephone service is provided by the visited cellular network.

15 Claims, 9 Drawing Sheets

BASIC SYSTEM OPERATION

BASIC SYSTEM OPERATION
DATA BASE UPDATE

BASIC SYSTEM OPERATION
DATA BASE UPDATE (CONTINUED)

SUPPLEMENTAL AUTHENTICATION PROCESS

FRAUD PREVENTION SYSTEM AND PROCESS FOR CELLULAR MOBILE TELEPHONE NETWORKS

FIELD OF THE INVENTION

This invention relates to cellular mobile telephone networks and more particularly to a process and apparatus for detecting fraudulent requests for service both within and outside of a subscriber's home base station area.

BACKGROUND OF THE INVENTION

Cellular mobile telephone services have been in operation in many parts of the world for several years and within the continental United States for nearly a decade. Cellular mobile telephone service is currently one of the most rapidly expanding types of communication services. The structure and general operation of several types of commercially available cellular mobile telephone systems is well documented in the patent and communication arts literature. One seeking a description of some representative types of equipment should see: U.S. Pat. No. 4233273 entitled Comprehensive Automatic Mobile Radio Telephone System; U.S. Pat. No. 4776003 entitled Cellular Mobile Radio Credit Card System; U.S. Pat. No. 4958368 entitled Customer Activation System; The Cellular Mobile Radiotelephone by Stephen Gibson, 1987, Prentice-Hall; or The Cellular Connection by Joseph Bernard, 1987, Quantum Publishing.

All of the prior art mobile telephone systems and particularly those in a multi-channel mobile radio telephone system involving a plurality of various carrier companies having a plurality of base stations covering different geographic areas have encountered substantial difficulties in attempting to provide telephone services which are comparable to facilities and services available to fixed or immobile telephone stations. As is well known to telephone subscribers in the United States, fixed telephone stations in the United States and in most developed countries for many years have provided practically instantaneous access to direct distance dialing networks and subscribers can dial calls to practically any fixed substation within the telephone network, and likewise receive calls from any fixed substation in the network; all without the assistance or intervention of a telephone operator. Multi-channel radio telephone systems have further problems, including substantial losses incurred with fraudulent theft of services. The fraudulent theft of services is attributable in large part to the movement of mobile subscribers from their home areas across the country, commonly referred to as "roamers". These operating problems are further complicated by the commercial objectives of the mobile telephone service companies in attempting to provide expanded services, including the ability of roamer mobile subscribers to freely and quickly automatically originate and receive calls to and from any other fixed or mobile stations in the network.

The growth and expansion of the cellular telephone usage since its inauguration in the Continental United States in 1983 continues at a rapidly expanding rate.

As of November 1991, there were more than 6.3 million cellular telephone subscribers in the Continental United States, and in the fall of 1991 cellular telephone service was available in all 306 metropolitan statistical areas across the Continental U.S., and the Federal Communications Commission is rapidly completing the licensing process for the so-called Rural Service Areas. Thus, with the rapid growth of cellular telephone technology and the substantial reductions in the size and price of cellular phones, the cellular telephone system will continue to rapidly expand and in the near future it will be available throughout the entire North American continent and expand rapidly into all of the developed countries of the world.

Fraudulent use or theft of service is one of the principal business and technical problems faced by cellular telephone service companies today and in the Continental United States is estimated to result in a loss on the order of $600 million for these companies. Fraudulent user is a term used by the cellular telephone industry to denote anyone who seeks to obtain or obtains cellular telephone services without authorization from the service provider companies. Fraudulent use of a cellular telephone can take several forms. For example: First— theft of a mobile telephone and subsequent unauthorized use in the same or different geographic area with the subsequent unauthorized user masquerading as the valid subscriber. Second—cloning or duplicating a valid mobile telephone by securing a valid mobile telephone subscriber's authorization data, including for example the Electronic Serial Number (ESN)—Mobile Identification Number (MIN) pair data either by purchase from service or installation personnel or by surreptitiously recording the ESN-MIN data while the valid user is transmitting or by electronically copying or duplicating the ESN-MIN data from a stolen mobile phone unit into one or more other cellular phone units. Third—fraudulent use of cellular phone services may involve the use of random, unauthorized ESN-MIN data which could be randomly generated by a data sequence generator to attempt to gain fraudulent access to mobile telephone services. Finally, hijacker or subscription fraud schemes generally involve an increase in the fraudulent user's phone power level in order to take over a legitimate mobile radio traffic channel assigned by the service provider company to another mobile subscriber.

U.S. Pat. No. 4955049 describes a fraud detection system which involves generating, in connection with the accounting and billing records of an authorized subscriber, a call sequence list which permits a legitimate subscriber to differentiate between authorized calls initiated by the subscriber and fraudulent calls made by an unauthorized party by using the ESN-MIN pair of the legitimate subscriber. This call sequence process does not detect the fraudulent use before mobile service is granted, but only distinguishes on a subscriber's mobile telephone bill between authorized and unauthorized calls. Further, active work on cellular fraud by various Telecommunications Industry Association members and committees as evidenced by EIA/TIA IS-41, Rev. B Draft Standard and EIA/TIA IS-54, Rev. B Draft Standard and suggested extensions of both, and other reports depend almost exclusively on the existence of a communications path, common IS-41B protocols, and a rapid response for queries of roamer status sent by visited networks to the roamer's home network. Unfortunately, current cellular systems, including IS-41 protocol, do not facilitate the detection of the most common types of mobile telephone fraud as described above and more importantly do not provide a process or apparatus for effectively sharing among local mobile telephone service providers current data regarding newly authorized ESN-MIN and/or stolen mobile phone data in order to facilitate detection of such fraudulent usage before service is granted. In addition to being dependent upon a network not controlled by cellular operators, it is highly questionable whether the future networks and accompanying IS-41 and IS-54 protocols, even when widely implemented, will be able to provide a grade of service to allow for effective fraud reduction.

As is known to those skilled in communication arts, the business and commercial objective of cellular telephone service companies has been to offer fast, convenient service to mobile users which is increasingly comparable with the services offered to fixed or immobile stations and provides practically instantaneous access to all direct dial networks. These commercial objectives have in a sense facilitated a number of types of cellular telephone fraud since the currently existing cellular telephone system protocols and clearinghouse and accounting and billing procedures utilizing services offered to the industry by two companies, namely GTE Telecommunications Services Inc., 100 S. Ashley, Tampa, Fla. 33602, and EDS Personal Communications Corp., 1601 Trapello Road, Waltham, Mass. 02154, do not provide anything like on-line real time responses, but instead require an inordinate time to process requests. Similarly, these current industry procedures referred to above do not provide any commercially secure procedure to encourage competitive companies to exchange any current customer authorization status data sufficient to detect and prevent fraudulent use of cellular telephone services before service is granted.

SUMMARY OF THE INVENTION

It is an object of the present invention to provide an improved cellular telephone process and system, including a distributed fraud prevention means.

It is another object of the present invention to detect fraudulent use in a cellular telephone system before service is initially granted to a fraudulent user.

It is another object of the present invention to provide an improved cellular telephone service authorization process for detecting fraudulent requests for telephone services.

It is another object of the present invention to provide an improved cellular telephone process and fraud prevention means that do not depend upon the Signalling System 7 network and related protocols.

It is another object of the present invention to improve cellular telephone networks by providing timely secure authorization data at distributed cellular exchange switch stations which can be readily accessed in response to an off-hook request for mobile telephone service.

It is yet another object of the present invention to provide improved cellular telephone switching apparatus for identifying, and recording, within individual radio telephone cell areas fraudulent requests for cellular service.

It is a still further object of the present invention to reduce fraud in cellular telephone systems by providing an improved process and apparatus for achieving rapid subscriber validation before telephone service is granted in response to an off-hook request.

These and other specific objectives and advantages of the present invention may be achieved in the specific illustrative embodiment of a cellular telephone network incorporating a distributed fraud prevention database memory and processor operatively associated with each mobile exchange switch center. Further, each such center has data input means associated with each fraud prevention database so that the local cellular telephone service company can update its local records with regard to a list of newly authorized ESN-MIN pair data as they are authorized and assigned to a new cellular telephone subscriber and a data list of lost or stolen cellular phone ESN-MIN pairs can be updated and kept current. Similarly, the input data means is appropriately coupled to appropriate communication means to provide such newly authorized and/or lost or stolen cellular phone ESN-MIN pair data to a central fraud prevention data bank. At prearranged time intervals, the central data bank would simultaneously transmit or broadcast, for example via satellite, the updated data on authorized and/or lost or stolen ESN-MIN pair data to all mobile exchange switch centers. Upon receipt by a mobile exchange switch center of an off-hook cellular service request signal, the local high speed memory associated with the mobile exchange switch center can readily determine if the requesting mobile phone user has a valid authorized ESN-MIN pair and if such data is on the lost or stolen list. Because this checking is done locally and without the need for off-line authorization checks, for example with the original or home base service company of the use, the verification process and lost or stolen phone checks will be accomplished within a period of a few milliseconds and will thus be transparent to the service requestor. Similarly, if the ESN-MIN pair data is not valid or if they are contained on the lost or stolen data list, this determination will be made before the requested service is granted. Additional procedures can automatically be triggered upon detection of a fraudulent request for service to record and locate the fraudulent user within a particular cell area and record or notify appropriate offices.

These and other objects, features, and advantages of the invention may be more readily comprehended from an examination of the following specification, appended claims and attached drawings in which:

DESCRIPTION OF PREFERRED EMBODIMENTS

Figure 1:
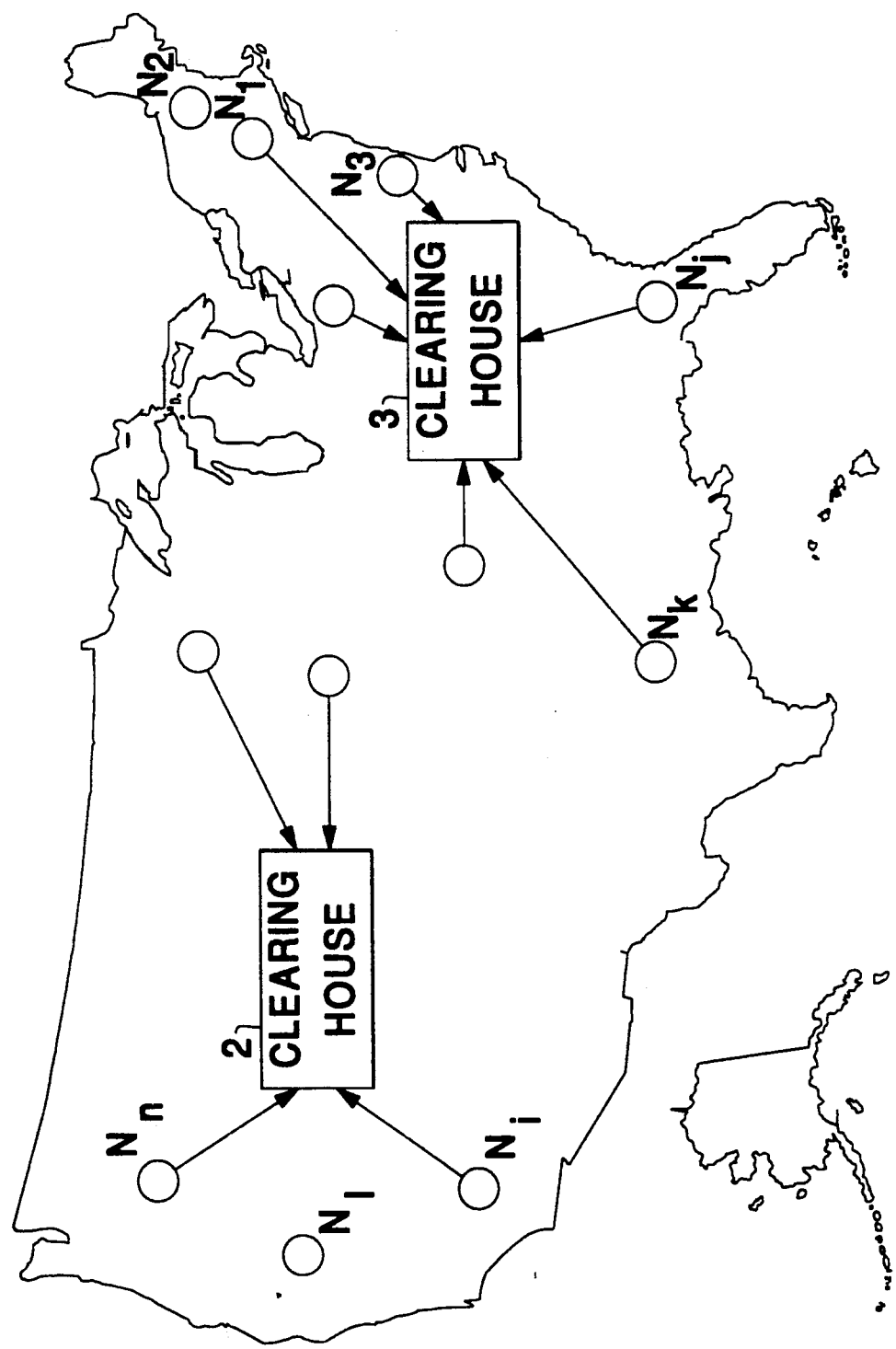
FIG. 1 is a schematic block diagram of prior art cellular telephone networks illustrated in a nationwide telephone system.
Figure 4:
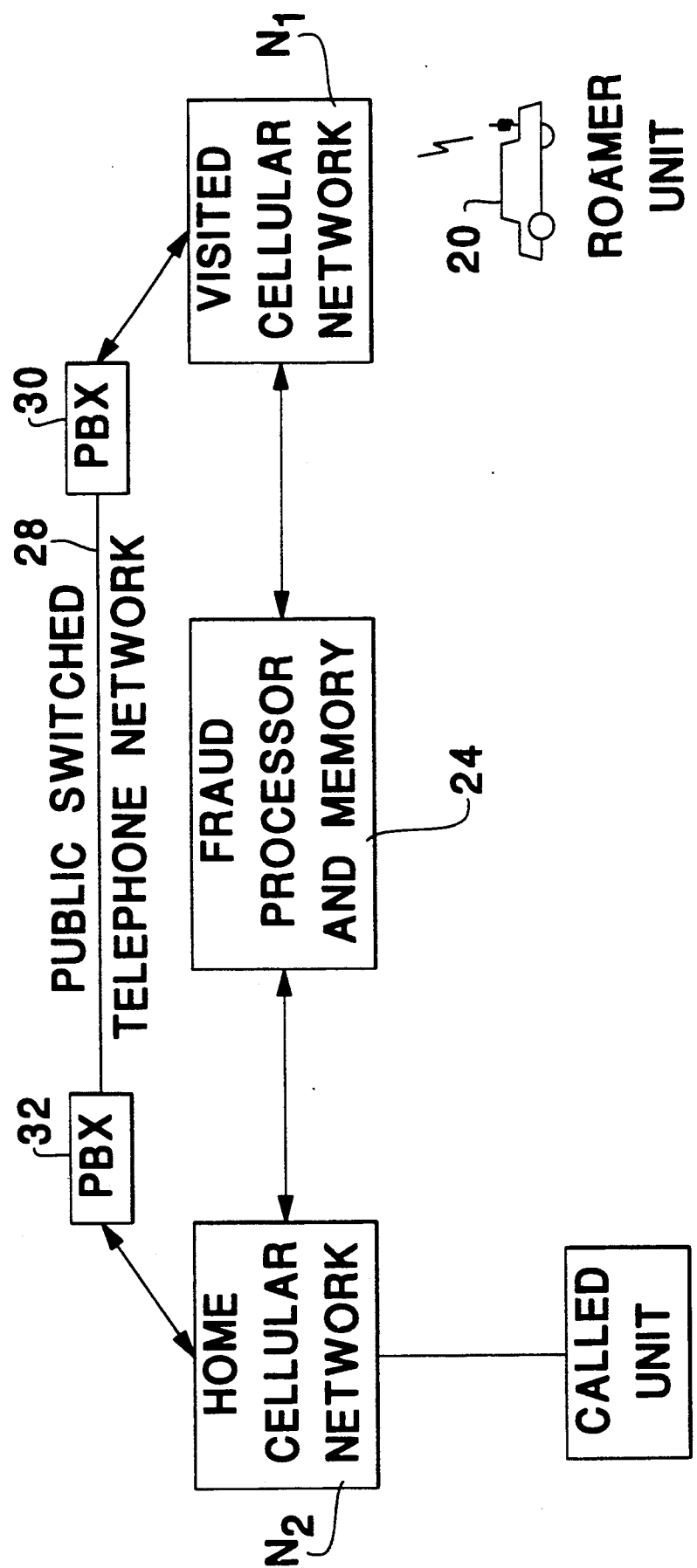
FIG. 4 is a block diagram of an improved mobile telephone exchange switch station in accordance with another aspect of applicants' invention.

Referring now to FIG. 1 there is shown a block diagram of the prior art cellular mobile telephone networks illustrated on a map of the United States. As is known by those skilled in the communication arts, there are more than 600 licensed cellular network service providers, $N_1, N_2, N_3, N_j \ldots N_n$, which provide mobile telephone services within their respective cellular geographic areas which are primarily the major metropolitan areas. In addition, the independent licensed cellular networks carry out automatic call transfer to other segments of the nationwide telephone system, for example, through network switches, which may for example be of a private branch exchange type as shown in FIG. 4. The prior art cellular telephone system has utilized two clearinghouse type service centers 2 and 3 offered commercially by GTE Telecommunications Services Inc., 100 S. Ashley, Tampa, Fla. 33602, and EDS Personal Communications Corp., 1601 Trapello Road, Waltham, Mass. 02154, which are principally protocol and accounting functions which arise in connection with intersystem services. As is known to those skilled in the telephone arts, the various cellular network service providers are independent mobile telephone companies which selectively interconnect mobile subscriber users to the public switched network and to other stations or mobile subscribers not shown which are connected or connectable via other mobile telephone companies or other parts of the country wide switchable telephone networks which can be connected by direct dial telephone calls. The prior art cellular networks $N_1$-$N_j$ as described above or in combination with the commercial clearinghouse functions 2 and 3 and industry protocols do not provide any practical process or protocols to detect and prevent fraudulent requests for mobile telephone services. While there is substantial data exchanged between the cellular network $N_1$-$N_j$ and the commercial clearinghouses, there is no existing protocol to assist or facilitate the detection at the local mobile telephone cellular network before mobile telephone service is granted in response to its receipt of an off-hook signal, particularly if the request for service is from a so-called roamer unit—that is, a mobile unit located outside the geographic area of its home base or primary cellular service provider company. There exists only proprietary protocols of switch manufacturers which operate only between switches of that manufacturer. Where implemented, these have stopped some tumbling fraud, but not cloning. In the prior art system shown in FIG. 1, it is possible for the cellular network $N_j$ which receives an off-hook signal from a roamer, which initiates a request for service by transmitting a so-called System Identification Number (SID) associated with its home base cellular service provider, and the user's Electronic Serial Number (ESN) and Mobile Identification Number (MIN) pair to call the home system provider designated by the received SID number before service is granted. However, this is generally not done because it is too long and involves too much delay. Accordingly, it has been the industry practice to permit a first roamer call for a particular SID/ESN/MIN user without any authorization user verification check with its home base. This practice and inability to identify fraudulent service requests before service is granted has resulted in increasingly costly losses for the domestic cellular telephone industry which for 1991 are estimated to be on the order of $600 million.

Figure 2:
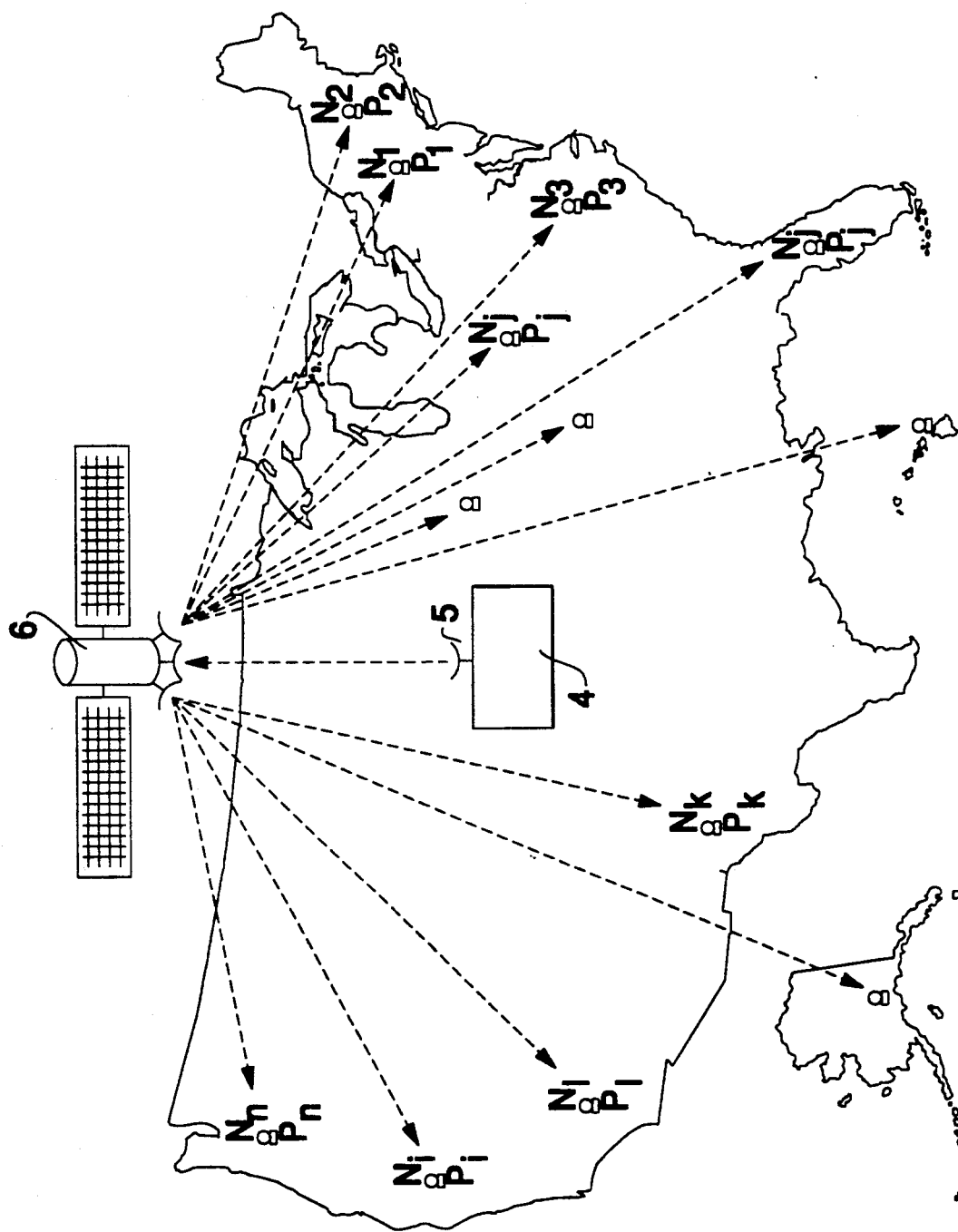
FIG. 2 is a schematic block diagram of one embodiment of the present invention incorporated in a plurality of domestic cellular telephone networks and illustrated in the nationwide telephone system.

FIG. 2 illustrates an improved cellular system which incorporates the distributed fraud prevention process and system of the present invention. As shown, cellular networks $N_1$-$N_j$, located in major metropolitan areas as illustrated on the map, incorporate a distributed local fraud prevention processor $P_1$-$P_j$. In addition, cellular system master database 4, which may for example comprise an IBM RISC 6000 processor or COMPACT System PRO processor which has associated for example 64 megabyte RAM and which may include for example ½ gigibyte of disc drive memory capable of storing digital data received from the individual cellular telephone service providers $N_1$-$N_j$ via for example standard telephone land lines capable of handling data rates on the order of 2000 baud. Authorized user data initially comprising for example a list of all ESN/MIN pair data as authorized by cellular telephone service provider $N_1$ would be sent via appropriate low cost transmission networks to master database 4 and similarly all of the cellular networks $N_2$-$N_n$, which have roamer or internetwork agreements with other networks would likewise send their respective user authorization data to the master database 4. In accordance with another aspect of applicants' invention the authorized user data from each cooperating cellular telephone network $N_j$ would include a list of lost or stolen cellular telephones by ESN-MIN pair data and that such authorized user data would be periodically, for example hourly or daily, would be sent by the cellular network $N_j$ to the central database 4. At periodic intervals, for example hourly or daily, central database 4 via microwave antenna 5 establishes a communication channel with orbital satellite 6 so that the user authorization data from the individual cellular telephone networks can be transmitted or relayed from the central database 4 via satellite 6 to the individual local fraud prevention processors $P_1$-$P_j$. In accordance with applicants' invention, by storing user authorization data for all cooperating cellular telephone network providers $N_1$-$N_j$ at each cooperating network center, the current authorized user data can be accessed in a convenient, timely manner to permit the mobile telephone service provider $N_j$ to determine if a service request is valid or fraudulent before service is granted. This validation process can be accomplished without the need to establish separate communication channels between the mobile network receiving a roamer service request and the roamer's home network. Accordingly, applicants' distributed fraud prevention processor and memory permits the individual mobile telephone service providers to ensure valid user authorization in a convenient and timely manner.

Figure 3:
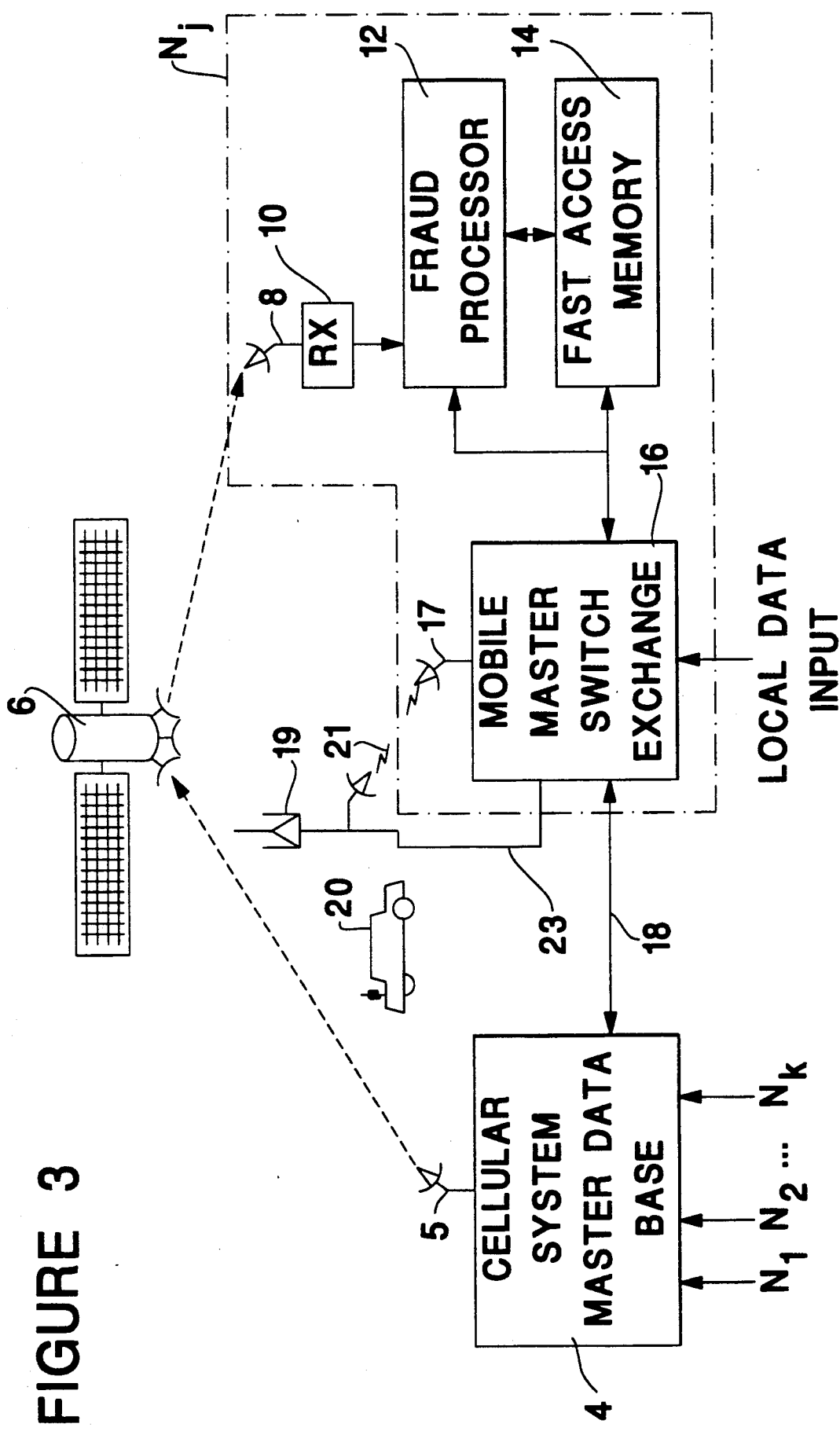
FIG. 3 is a block diagram of a cellular telephone mobile telephone exchange switch in accordance with one aspect of the present invention.

Referring now to FIG. 3 there is shown a block diagram of the preferred embodiment of applicants' distributed fraud prevention system. As previously described cellular system central database 4 receives authorized user data from cooperating cellular telephone networks $N_1$-$N_j$ via any appropriate low cost data transmission channels between the individual cellular service providers $N_1$-$N_j$ and master database 4. Periodically, the authorized user data is sent via microwave antenna 5 and orbital satellite 6 to antenna 8 assorted with a receiver 10, which for example may comprise a KV Band California Microwave Model KIDS 1 meter receive only system of a C Band Equitorial Model C100 receive only system. Authorized user data received by receiver 10 is processed by fraud prevention process 12 which may comprise for example a COMPACT System PRO having a ½ gigibyte hard disc and associated 64 MByte fast access memory store 14. Mobile master exchange switch 16 which may comprise an ESS7 or Ericsson MSC configured AXE-10 mobile switch is operably coupled with fraud prevention processor 12 via any standard IBM PC interface for example interface X.25 at 9.6 KBs which, as is known to those skilled in the data processing arts, has its published specifications and protocols for handling data input/output procedures. In addition, if the mobile exchange switch is so designated by the cellular telephone service provider network $N_j$, it has an appropriate data port to communication via link 18 to periodically provide updated authorized user ESN-MIN pair data and optionally personal data such as biometric or PIN and optionally equipment authentication data for example described in IS-54, Rev. B and optionally an ESN-MIN data list for lost or stolen units originally authorized by each such cellular telephone service provider network $N_j$.

The following description of the process for handling an off-hook request for service from a mobile telephone user is for illustrative purposes only and those skilled in the art will understand many variations may be made without departing from the scope of the present invention. With power applied to a mobile telephone subscriber unit, a user initiates a call, an off-hook signal transmitted by the mobile subscriber unit 20 would initiate a request for service to establish either a mobile to land station or mobile to another mobile station call. The procedures for these respective service requests vary depending upon whether the off-hook signal is from a roamer unit, i.e., a mobile unit not in its home base area, or whether the call is to a land or another mobile unit outside its home base. The procedure necessary to provide cellular radio telephone subscribers with services which require interaction between different cellular systems are fully described in EIA/TIA Industry Standard IS-41.3A and IS-41.3B (Draft) are incorporated herein by reference. For purposes of understanding the structure and operation of applicants' invention it is sufficient to understand that the off-hook request for service signal automatically generates and transmits from the mobile unit 20 to the antenna 19 and relayed by microwave 21 or land line 23 to the master exchange switch 16 the SID and the ESN-MIN pair data described above. The master exchange switch 16 upon receipt of the SID signal classifies the requestor as a roamer if the SID identifies another service provider $N_j$ different from the receiving network. If the requestor is not a roamer, then if the service request is from a valid user the ESN-MIN pair should correspond to the local networks authorized user data if the ESN/MIN data is not listed on the lost or stolen data list. However, if the SID identifies the requestor as a roamer, then in accordance with the present invention, master mobile switch 16 signals fraud prevention processor 12 to initiate a logic data comparison of authorized user data and lost or stolen phone data for the network identified by the received SID data and stored in fast access memory 14. Assuming there is a valid match between the received ESN-MIN pair data and that stored in fast access memory for the identified service provider company and the ESN-MIN pair is not listed on the lost or stolen phone list for the network data associated with the requestor, and the home network has not issued a "deny service" order, for example a user is delinquent in paying their phone bill, the service is authorized and the requested service is provided. Correspondingly, if there is no valid comparison match for the requesting ESN-MIN pair data or if the ESN-MIN data is contained in the lost or stolen phone data list or a "deny service" order is associated with this ESN/MIN, the service request would be classified as fraudulent or not authorized and service would be denied.

For a complete understanding of the interaction of the accounting and billing procedures associated with such interaction between different cellular networks reference may be had to EIA/TIA Industry Standard IS 41.3A, or IS-41.3B (Draft), or U.S. Pat. No. 4233473 entitled Comprehensive Automatic Radio Telephone System issued Nov. 11, 1980 to E. G. Frost.

FIG. 4 illustrates another embodiment of the present invention in which authorized user data is directly exchanged between cellular networks $N_1$ and $N_2$ designated the visited network and home network respectively. In accordance with the embodiment illustrated in FIG. 4, cellular networks $N_1$ and $N_2$ are designed to exchange authorized user data for their respective networks. As previously explained in conjunction with FIG. 3 such authorized user data for the respective networks would be updated and exchanged via appropriate low cost data transmission channels not shown. Alternatively, networks $N_1$ and $N_2$ would designate a common fraud processor and memory 24 which for example could be IBM 4300 central data processor and associated IBM Model 3350 direct access disk storage units which would function in a manner similar to that described above in connection with FIGS. 2 and 3. As illustrated in FIG. 4, when a roamer unit 20 having a home base $N_2$ requests service when in visited network $N_1$, the master exchange switch of $N_1$ would access the associated fast access memory of fraud processor 24 to determine whether the request for service is from an authorized user as then designated by network $N_2$. Assuming the user authorization data received by visited system $N_1$ is determined by the logic data comparison process by the fraud prevention processor 24 similar to that described above in connection with FIG. 3 to be valid and proper, the requested service via voice network 28 including PBX exchange switches 30 and 32 would be granted and the procedures described above would be completed.

Referring now to FIG. 5 there is shown a composite logic flow diagram for the fraud prevention process and system in accordance with still further aspects of the present invention.

Figure 5A:
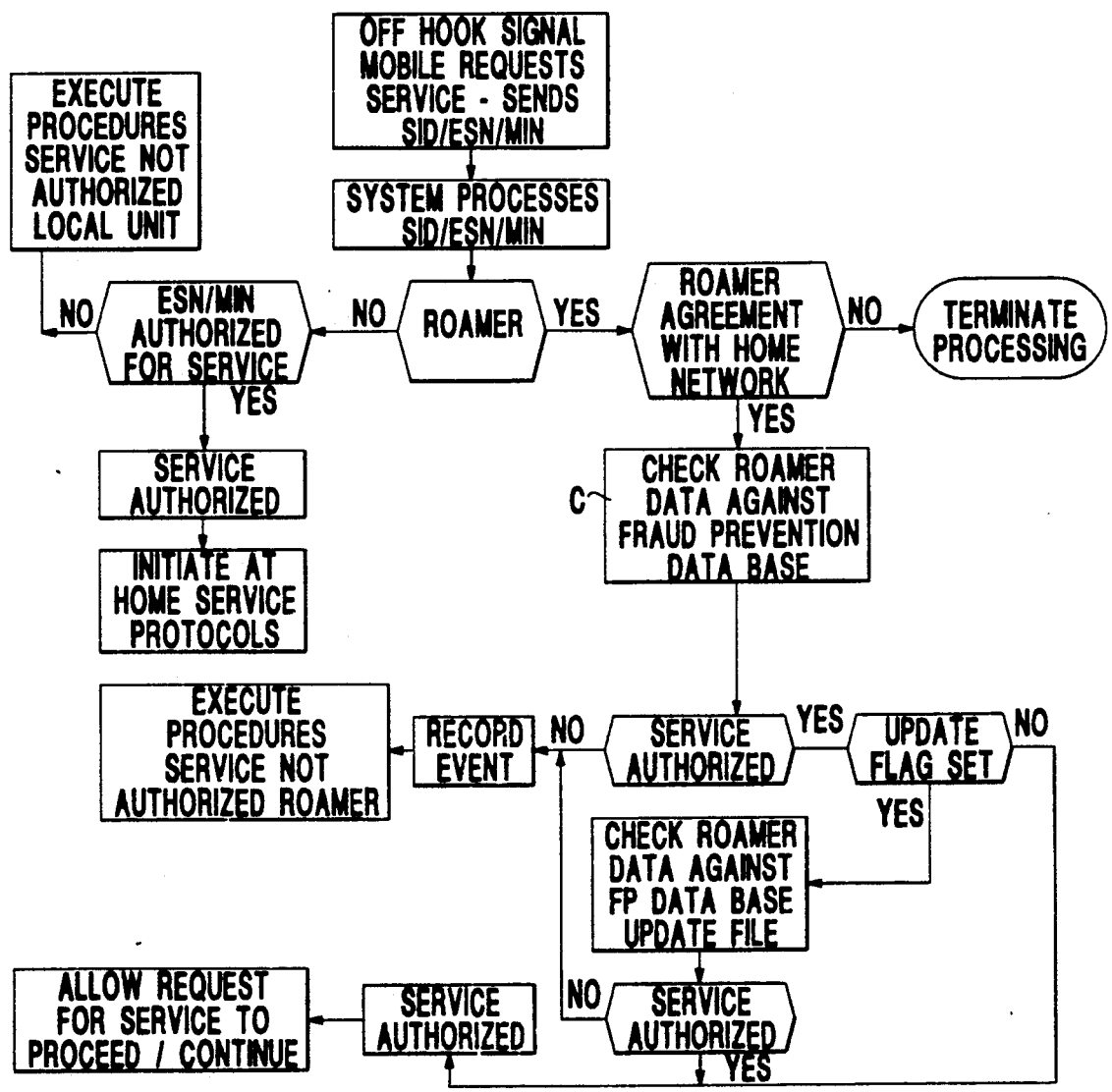
FIG. 5 is a composite logic flow diagram of FIGS. 5A, 5B, and 5C illustrating the operation of a mobile exchange switch station in accordance with another aspect of applicants' invention.
Figure 5B:
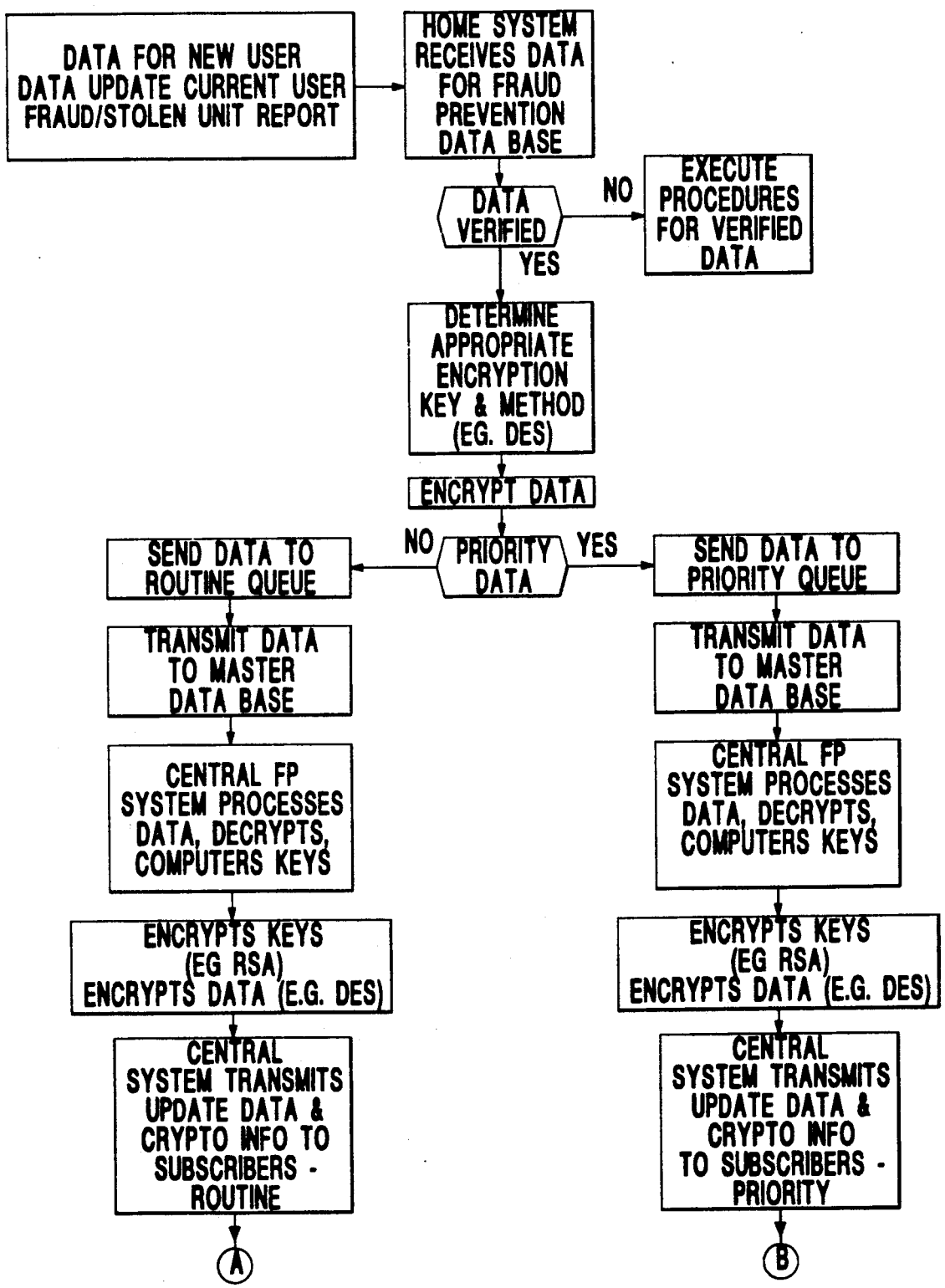
Figure 5C:
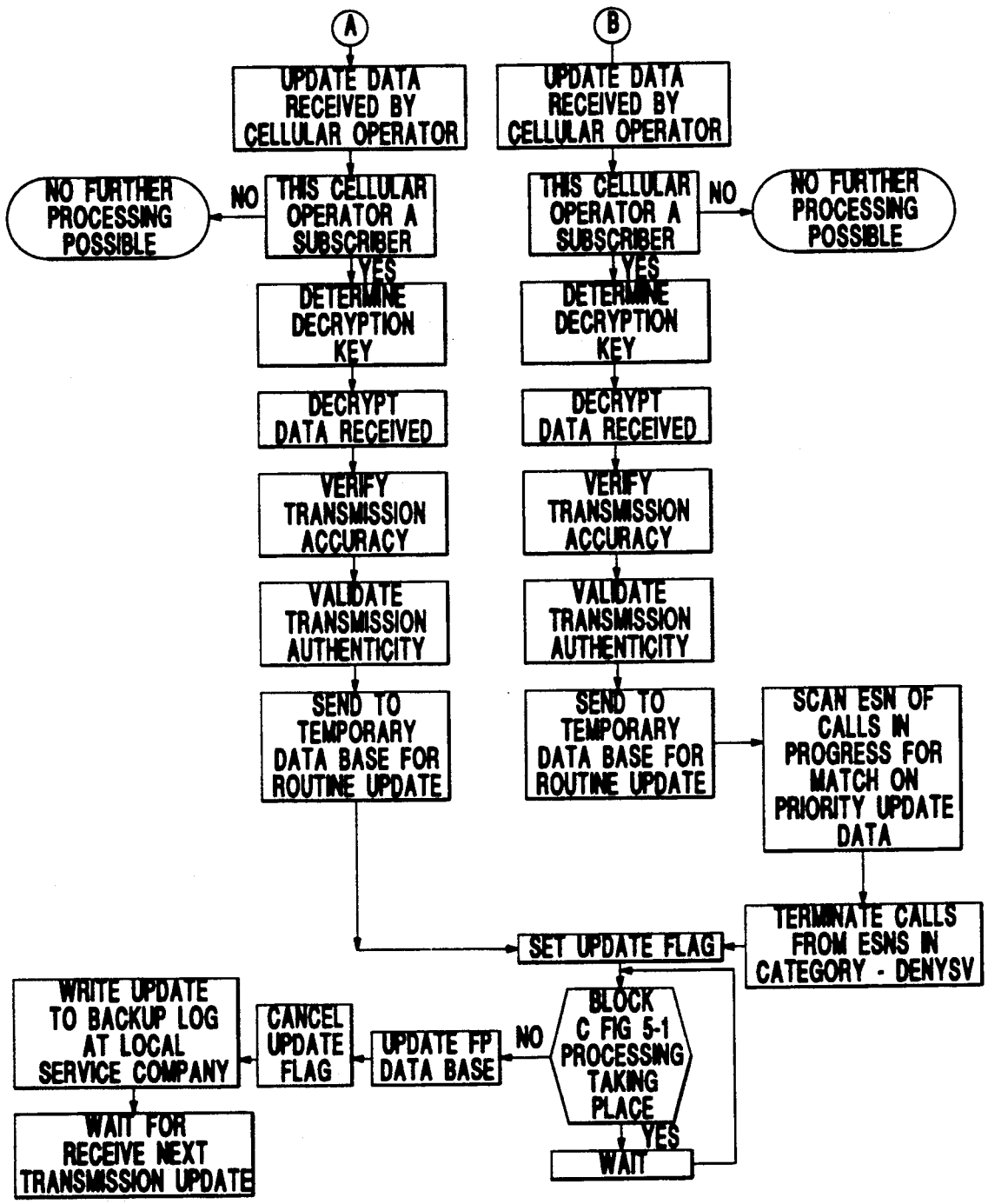

With reference to FIGS. 5A, 5B, and 5C arranged as illustrated in FIG. 5, the basic operation of applicants' improved cellular telephone process and apparatus will be illustrated by the logic flow diagram sequence depicted. As discussed above with reference to FIGS. 3 and 4, the request for service by a mobile subscriber is initiated by the generation of the off-hook signal which initiates the transmission of the SID/ESN/MIN data to the mobile master exchange switch. By processing the SID data the exchange switch determines if the requesting subscriber is a roamer or local mobile subscriber. If the requesting subscriber is at home the local data is checked for verification of user authorization and if valid service is granted. As part of the authorization process in accordance with another aspect of applicants' invention, additional verification processes such as PIN or personal data would be checked. If the requesting user is determined to be a roamer, the next step in the user authorization process is to determine if the necessary service provider company has a roamer agreement with the home network designated by the received SID data and, if not, service is denied. If the receiving company has a roamer agreement with the company designated by the received SID data, then the user authorization process continues by checking the received ESN/MIN data, and optionally other data as further explained, particularly in FIGS. 5A and 5B. If the received ESN/MIN data is validated for the associated SID network, service is authorized and the appropriate protocols for initiating service, e.g., EIA/TIA IS-41.3A, are initiated. Correspondingly, if the received ESN/MIN data does not match or the home network has issued a "deny service" order, service is denied and the system executes the non-authorized roamer recording and reporting procedures.

With reference to FIGS. 5B and 5C, the logic process for updating the fraud prevention database data to be stored in master database memory 4 as illustrated in FIGS. 2, 3, and 4 may be understood. As illustrated in FIG. 5B, the independent cellular telephone service providers $N_1 \ldots N_j$ which elect to participate in the fraud prevention system would periodically send their respective user authorization data and updated data, lost or stolen phone data, and personal identification data which, in accordance with another aspect of the present invention, may be encrypted voice print data of the authorized customer, to the master data memory 4 for further transmission to the respective cooperating cellular telephone service providers. As part of this data update procedure, it is desirable, in accordance with another aspect of applicants' invention, that the updated data be classified as routine or priority. For example, any update data relating to lost or stolen units preferably should be classified priority for expedited handling both by the central memory database 4, communication transmission link 6, and independent service provider companies $N_1 \ldots N_n$. In this manner, the fraud prevention memory 14 at the local service provider companies can be kept up to date. As illustrated in FIG. 5B and 5C, the priority data is designated for expedited handling and delivery to the fraud prevention database at the local operating service provider. As will be further explained in connection with FIG. 7, the reception of user authorization data at the fraud prevention processor and memory sets an appropriate flag or signal the presence of which alerts the master mobile switch 16 that the update memory section must be checked before the service authorization request in process is completed. This enables the local service provider company $N_1 \ldots N_n$ to use the latest available user authorization data then available before the authorization decision is made and service is either granted or denied, as appropriate.

Figure 6:
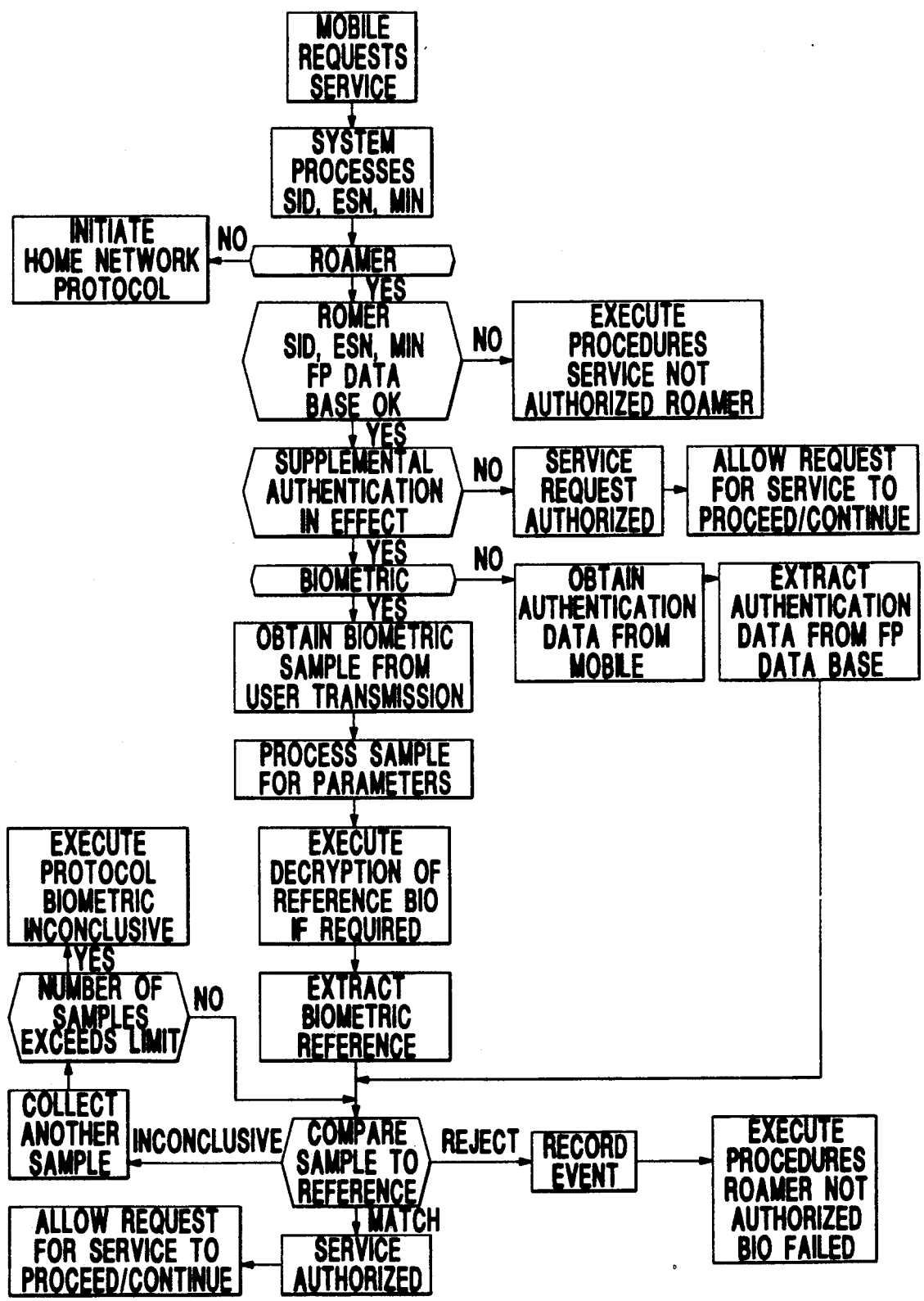
FIG. 6 is a logic flow diagram illustrating the encrypted segments of the authorized user database in accordance with another aspect of applicants' invention.

Referring now to FIG. 6, applicants' improved service authorization process, including supplemental personal identification data, will be explained with reference to the illustrated logic flow diagram. As explained above with reference to FIG. 5 and FIG. 3, the mobile request for services is initiated by the off-hook signal which initiates the transmission by the mobile unit of its SID, ESN and MIN data. Again, upon determination the requesting unit is a local or at home unit, the normal home base protocol is initiated for verification, which in accordance with another aspect of applicants' invention, could likewise include supplemental authorization process steps including personal identification numbers or data as will be hereinafter described with regard to a roamer. If the requesting unit is classified as a roamer, again the first check, as before, is whether a roamer agreement is in effect between the receiving cellular service provider company and the company identified by the received SID data. If this decision is negative, the service denied protocol would be initiated. If the receiving company has a roamer agreement in effect with the company identified by the received SID data, the supplemental authorization process is initiated in which for example the personal identification data, e.g., an authorized voice print data, is extracted from the received data and compared with the personal identification data previously stored in the fraud processor memory for the received ESN/MIN data.

As will be understood by those skilled in the computer arts, the personal identification data may be in either analog or digital format and likewise may be either in plain text or encrypted data form when stored in the fraud processor memory 8 and when transmitted by the requesting cellular telephone unit 20 in connection with its request for service. Particularly if the transmitted personal identification data is in analog form, the test may be inconclusive because of noise interference or like types of signal degradation. In which case it may be necessary to collect another biometric sample before appropriate sample parameters of the received personal identification data can be compared with the data for the same SID/ESN/MIN data stored in the fraud processor memory 8 can be completed. Again, the test would result in authorization of requested service or denial of such service depending upon whether the comparison was positive or negative, respectively.

Figure 7:
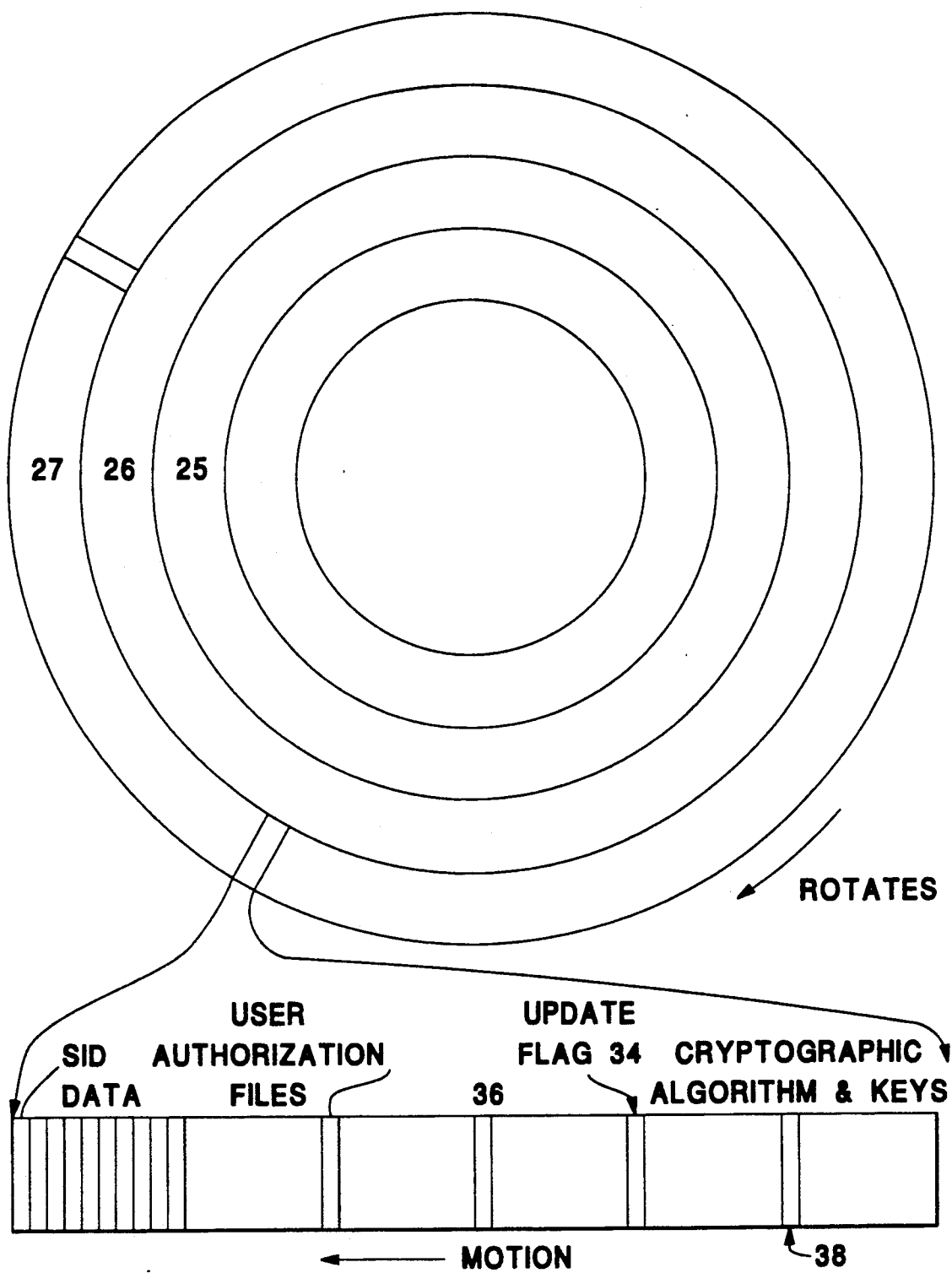
FIG. 7 is a schematic block diagram illustrating the segmented direct access magnetic memory device for storing in accordance with another aspect of applicants' invention.

Referring now to FIG. 7, the preferred data format for the user authorization data is illustrated schematically with reference to a typical direct access storage unit which might for example by an IBM DASD 3380 unit with its associated Controller 3880. For the current 6.3 million phones in service by way of example, the storage capacity for memory, assuming all 6.3 million units, ESN 32 bits (4 bytes), MIN 34 bits (5 bytes), and SID 15 bits (2 bytes), is 69.3 million bytes. In order to provide adequate response times for the comparison of received data with data stored in the fraud processor memory, an access and search time of 100 to 500 milliseconds per query is desirable depending upon cellular system demand. As is known to those skilled in the art, data structures can be created using for example SIDs or ESNs as pointers so that a minimum and only relevant stored data is actually searched. As illustrated, the magnetic disc is arrayed to rotate in a clockwise direction and has on the surface a number of circular tracks or segments 25, 26, 27, etc. As is known to those skilled in the art, the magnetic segments or tracks are operably associated with read/write heads, not shown, which can be selectively positioned to read or write data at predetermined addressable locations. In the preferred embodiment of applicants' fraud prevention process and apparatus as shown in FIG. 5, the user authorization data for each respective cellular network $N_j$ of FIG. 2 would be encoded by network $N_j$ before it is sent to the fraud prevention central memory 4 by network $N_j$ so that fraud is further deterred by preventing the inadvertent disclosure of this highly sensitive business information, particularly the personal identification data associated with individual cellular customers. The process or method of encryption may be any of a number of processes or combination of processes well known in the arts for data protection, for example the Data Encryption Standard and RSA public key algorithm, including use of various keys or codes and their associated key management schemes, for example a public key scheme, for example RSA, for distributing keys to facilitate cryptographic processes. With the use of encrypted user authorization data it will be necessary, as is known to those skilled in the data handling arts, to provide appropriate means to permit the cellular service company which receives a roamer's request for service to compare the received user identification data, e.g., SID/ESN/MIN and possibly PIN data or personal data, with the user authorization data stored in the fraud processing memory 4. In the preferred embodiment of applicants' invention, the cryptographic data for a particular independent cellular telephone service provider $N_j$ would be sent by the network $N_j$ to other service provider networks $N_j \ldots N_k$, which have reciprocal roamer agreements with network $N_j$. The received cryptographic data would then preferably be stored in the track or segment associated with the user authorization data of network company $N_j$. In this manner the cryptographic data could be utilized by a service provider network receiving a request for services to encrypt the received ESN/MIN and/or personal identification data to facilitate the data comparison to be made between the stored encrypted user authorization data and the encrypted form of the received roamer ESN/MIN data. Alternatively, cryptographic data would be supplied by the network $N_j$ to its affiliated companies which have reciprocal roamer agreements and then the authorization process would include the additional step of decrypting the stored user authorization data before it is compared with the ESN/MIN and/or personal identification number data received for the requesting unit, resulting in a comparison of plain text rather than encrypted data.

As discussed above with reference to FIG. 6, it is desirable to alert the fraud processor if it is in the process of receiving updated user authorization data. As illustrated in FIG. 7, this can be done by setting a particular data bit or flag 34 in the record for a particular network $N_j$ identified by its unique SID data. Thus for example, if the flag 34 is a logic 1 or is "set", this would alert the fraud processor 12 that the additional update memory section or track 36 associated with a particular SID data must be checked before the user service authorization process is completed. The update flag 34 thus ensures the latest available user authorization data is checked before the service authorization decision is made.

The foregoing description of applicants' improved process and system for detecting fraudulent service requests in a cellular telephone network is illustrative and many modifications may be made without departing from the scope of their invention as claimed below.

What is claimed is:

1. In a cellular telephone system including a plurality of independent cellular telephone networks each network having at least one mobile master exchange switch and related radio transmission facilities for providing cellular telephone services within its respective cell areas to mobile cellular subscribers and wherein each mobile telephone unit authorized for subscriber use by one of said independent cellular telephone networks has an assigned system identification number (SID) data for identifying one of said independent cellular telephone networks as the authorizing cellular network and further wherein each mobile telephone unit authorized for use by a subscriber has an assigned customer identifying electronic serial number (ESN) and mobile identification number (MIN) data pair and wherein said SID data and said ESN-MIN data pair collectively comprise subscriber authorization data, a fraud prevention system comprising:

a central database memory means for storing subscriber authorization data form at least some of said plurality of independent cellular networks, data transmission means for facilitating the transmission of said subscriber authorization data form said central database memory means to individual ones of said independent cellular telephone networks having different SID data, fast access memory means at each said independent cellular telephone network for storing subscriber authorization data relating to authorized subscribers of different ones of said independent cellular telephone networks, data input means for updating said subscriber authorization data stored in said central database memory means, and authorization logic means for comparing user subscriber authorization data received in conjunction with an off-hook signal from a mobile subscriber with said subscriber authorization data stored in said fast access memory means having the same SID data as said requesting mobile subscriber to determine if the mobile subscriber requesting service is a valid authorized subscriber.

2. The fraud prevention system of claim 1 wherein said data transmission means includes orbital satellite means for simultaneously transmitting data stored in said central database memory means to individual receiving data terminal means at each of said independent cellular telephone networks.

3. The fraud prevention system of claim 1 further including:

data processing means at each of said plurality of independent cellular telephone networks for encrypting the subscriber authorization data before said subscriber authorization data is transmitted to said central database memory means, and means at each of said plurality of independent cellular telephone networks for facilitating comparison of encrypted subscriber authorization data in response to said authorization logic means.

4. The fraud prevention system of claim 1 wherein said central database memory means comprises a segmented memory including a plurality of separate memory segments whereby subscriber authorization data of each of said plurality of independent cellular telephone networks is segregated by SID data into different selectively addressable memory segments.

5. A process for detecting fraudulent request for service by a mobile telephone user in a cellular radio telephone system including a plurality of independent cellular service providers in which each cellular service provider has at least one master mobile exchange switch means for providing mobile cellular telephone services within its respective cell areas within said system, said process comprising the steps of storing user unit authorization data for a plurality of independent cellular service providers in a database, transmitting said user unit authorization data to at least some of said plurality of independent cellular service providers, storing said user unit authorization data in fast access memory means having data communication connections with a plurality of said independent master mobile exchange switch means, accessing said user unit authorization data stored in said fast access memory means in response to the receipt at one of said master mobile exchange switch means of an off-hook request for service form a mobile telephone user unit, and determining at said receiving master exchange switch means whether said mobile telephone user service request is from a valid authorized user unit by comparing the stored user unit authorization data with telephone user unit identifying authorization data received in conjunction with said off-hook request from a mobile telephone user unit requesting cellular telephone services before cellular telephone service is granted.

6. The process of claim 5 wherein the step of storing user authorization data includes the steps of storing authorized ESN-MIN pair data and of storing ESN-MIN data identifying unauthorized mobile telephone units form individual ones of said independent cellular service providers.

7. The process of claim 6 further including in the step of storing the step of storing personal identification data along with said user authorization data and wherein the step of determining further includes the step of comparing said stored personal identification data with personal identification data received in conjunction with said off-hook request.

8. The process of claim 5 where in the step of transmitting said user authorization data comprises the step of simultaneously broadcasting to receiving means at individual ones of said independent cellular telephone service providers.

9. The process of claim 5 additionally including the steps of updating by said plurality of independent cellular service providers of user authorization data previously stored in said fast access memory and of transmitting updated user authorization data to said plurality of independent cellular service providers, and determining at said receiving master exchange switch means whether calls in progress form said mobile telephone user units are valid by comparing the latest received user authorization data with telephone user identifying data of calls currently in progress.

10. An improved master exchange telephone switch operable in a mobile telephone network for providing cellular mobile telephone services requiring interaction between independent cellular systems wherein each independent cellular system has a different cellular telephone system identification number (SID) data stored in each cellular telephone subscriber unit authorized for use by each respective one of said plurality of independent cellular systems and for detecting fraudulent requests for services before the service is granted, said improved master exchange telephone switch comprising:

communication means for recognizing an off-hook service request signal from a cellular mobile telephone subscriber user, memory means for storing user authorization data for a plurality of independent cellular systems, input data means for updating said memory means with updated user authorization data previously stored in said memory means, and authorization logic means for selectively accessing said memory means in response to receipt of an off-hook signal form a mobile cellular telephone subscriber user for comparing user authorization data received in conjunction with said off-hook signal with user authorization data stored in said memory means.

11. The improved master exchange switch of claim 10 wherein said input data means includes receiver means for receiving updated user authorization data from an orbital satellite transmitter.

12. The improved master exchange switch of claim 10 wherein said memory means comprise a plurality of individual segments of a segmented memory means for storing user authorization data of each of a plurality of independent cellular service providers in separate memory segments.

13. The improved master exchange switch of claim 10 additionally including data processing means for facilitating the comparison of said user authorization data.

14. The improved master exchange telephone switch of claim 10 wherein said memory means includes means for storing ESN-MIN pair data identifying unauthorized mobile telephone units and for storing personal identification data uniquely identifying each authorized subscriber.

15. The improved master exchange telephone switch of claim 10 further including means for processing encrypted authentication data unique to each mobile unit.

* * * * *